April 23, 1957  J. H. KIRBY II  2,790,116
MAGNETIC FISHING TOOL AND METHOD OF MANUFACTURE
Original Filed July 30, 1952  2 Sheets-Sheet 1

John H. Kirby II
INVENTOR.

BY Murray Robinson
ATTORNEY

April 23, 1957  J. H. KIRBY II  2,790,116
MAGNETIC FISHING TOOL AND METHOD OF MANUFACTURE
Original Filed July 30, 1952  2 Sheets-Sheet 2

John H. Kirby II
INVENTOR.

BY Murray Robinson
ATTORNEY

United States Patent Office 2,790,116
Patented Apr. 23, 1957

2,790,116

MAGNETIC FISHING TOOL AND METHOD OF MANUFACTURE

John H. Kirby II, Houston, Tex.

Continuation of application Serial No. 301,682, July 30, 1952, now Patent No. 2,668,077, dated February 2, 1954. This application November 21, 1956, Serial No. 623,517

4 Claims. (Cl. 317—159)

This invention pertains to tools for removing undesired materials from a well and more particularly to a magnetic tool for fishing magnetic junk out of a hole in the earth drilled by the rotary method, from which hole oil or gas is to be produced.

This application is a continuation of copending application Serial No. 381,187, filed September 21, 1953, now abandoned, which was a division of application Serial No. 301,682, filed July 30, 1952, now issued as U. S. Patent 2,668,077. Application Serial No. 301,682 was a continuation-in-part of my prior application Serial No. 239,901, filed August 2, 1951, entitled "Well Tool," now abandoned.

It is the principal object of the invention to provide a magnetic fishing tool which will be more efficient in the removal of junk.

A more specific object of the invention is to provide a magnetic fishing tool in which the distribution of the magnetic field is controlled so as to make it more effective for holding magnetic junk.

A further object of the invention is to provide a magnetic fishing tool having fluid circulation means for clearing mud and detritus away from the magnetic junk wherein the fluid path is so positioned as to have a more effective field of action.

Still another object of the invention is to provide a magnetic fishing tool having a rotary shoe for clearing heavy and consolidated materials away from the magnetic junk wherein the shoe is positioned so its field of mechanical action cooperates more effectively with the magnetic and fluid-dynamic fields.

Another object of the invention is to provide a magnetic fishing tool which is more rugged and durable and better protected against accidental damage.

A further object of the invention is to provide a magnetic fishing tool which will more firmly hold the magnetic junk or fish.

Another object of the invention is to provide a magnetic fishing tool capable of holding a larger number of separate fish.

Still another object of the invention is to provide a magnetic fishing tool which will more nearly assure a one hundred percent removal of all the junk.

Another object of the invention is to provide a magnetic fishing tool that is more easily manufactured and repaired and maintained.

Other objects and advantages of the invention will appear from the following description of two preferred embodiments of the invention.

Reference will be made to the accompanying drawings wherein.

Figure 1:
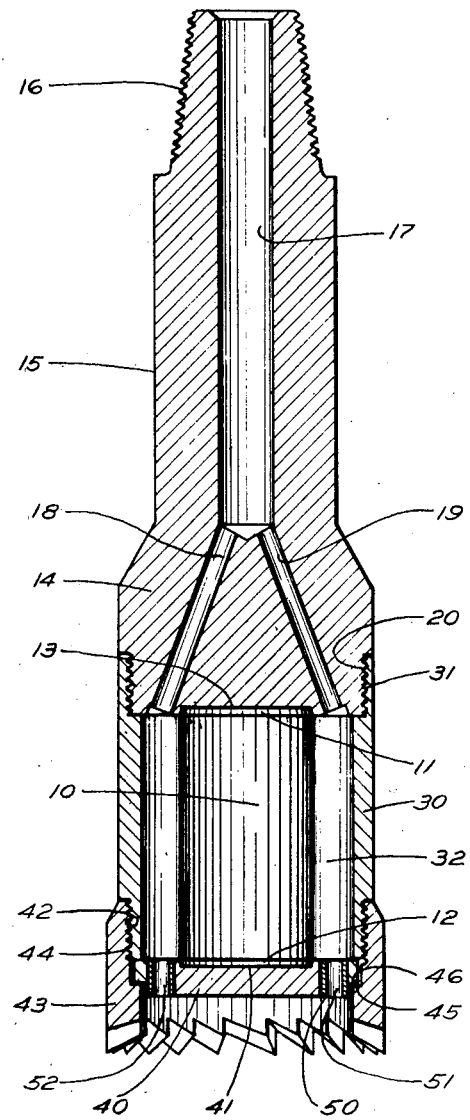
Figure 1 is a vertical section through one form of magnetic fishing tool embodying the invention.

Referring to Figure 1 there is shown a magnetic fishing tool including a permanent bipolar bar magnet 10 having opposite poles at its upper and lower ends. The magnet has the shape of a cylindrical rod and is tapered or beveled slightly at its ends as shown at 11, 12. The magnet is made of one of the modern ferromagnetic alloys having a high retentivity and field strength. A suitable magnetic material is described in Quick magazine of May 28, 1951, at page 47, where it is indicated that such a magnet is manufactured by the General Electric Company and marketed under the name "Alnico V." Such magnets may consist of a combination of cobalt, aluminum, nickel and iron. Such magnets may also include platinum as one of the alloyed materials and are known as platinum magnets.

The upper beveled end 11 of the magnet is received in a correlative recess 13 in a cylindrical head 14. The head is provided with a cylindrical fishing neck 15 and has a screw thread 16 on its upper end adapted to engage a fluid conduit such as a drill pipe, drill collar, or tubing string. The head has a central fluid passage 17 in its upper portion communicating with a plurality of circumferentially spaced apart downwardly diverging fluid passages, two of which are shown at 18 and 19. The lower end of the head is provided with a screw thread 20. The head is made of high permeability ferromagnetic material of low retentivity.

A cylindrical tube 30 has an internal thread 31 engaged with the thread 20 on the lower end of the head. Tube 30 is made of high permeability low retentivity ferromagnetic material and in conjunction with the head which bridges over between the upper ends of the tube and magnet conducts the flux from the upper pole of the magnet down to the level of the lower pole of the magnet where there is induced an annular pole concentric with the pole at the lower end of the magnet and of opposite polarity. The cross sectional area of tube 30 is preferably at least equal to that of the magnet. The tube 30 also forms a shell or housing surrounding and protecting the magnet 10 and therefore is preferably made of tough steel. The inner diameter of the housing is greater than the outer diameter of the magnet leaving an annular space 32 therebetween.

Space 32 provides a region free of ferromagnetic material to prevent short circuiting of the magnet so as to insure maximum field intensity at the bottom of the magnet and the bottom of the housing. Space 32 also serves as a fluid passage and the lower ends of the fluid passages in the head open into space 32.

A disc shaped pole plate 40 has a recess 41 in its upper face corresponding to and receiving the lower end of the magnet. The plate overlaps the lower end of the tube 30. Tube 30 has a screw thread 42 on its lower end. A rotary shoe 43 has an internal thread 44 which engages thread 42. An internal shoulder 45 on the rotary shoe engages a correlative shoulder 46 on the pole plate whereby on tightening the rotary shoe the whole assembly is firmly held together. The rotary shoe may have any desired axial extent and number of teeth and may be of helical shape such as that shown on page 740 of the 1951 edition of the Composite Catalogue of Oil Field and Pipe Line Equipment. The shoe chosen should be adapted to the particular type and disposition of junk being fished for. If the junk is flat on the bottom of the hole, a plain ring having no teeth and coplanar with the pole plate bottom face would be suitable. Where there are a number of drill bit cones to be recovered, a toothed shoe as shown would be suitable. A helical shoe would be useful in recovering junk standing on end and leaning against one side of the hole.

The pole plate is a composite member including a central area of disc shape adjacent the lower end of the magnet and formed of tough ferromagnetic material such as mild steel. The pole plate also includes an outer ring of material held between the shoe and housing and made of similar material to that of the central area. Between the central and outer areas is a ring 50 of brass or other non-ferromagnetic material. This ring constitutes an extension of the non-ferromagnetic region of space 32. A plurality of circumferentially spaced fluid passages such as 51, 52 through the brass ring communicate with space 32.

The pole plate partially bridges the gap between the lower ends of the magnet and housing so as to reduce the reluctance of the magnetic circuit and help maintain the magnetism of the permanent magnet. The gap is sufficient however to cause the field to be distributed over the inner and lower surfaces of the rotary shoe and its teeth. Due to the concentric disposition of the magnetic circuit, the flux lines are radial and hence more concentrated near the center of the tool. Small pieces of junk will therefore be drawn to the center pole and will not bridge over the gap. Large pieces will bridge only part of the gap in a particular sector of the radial field. Therefore, the contacting of even several bit cones and many bearings will not completely short circuit the magnet which will still hold additional junk on contact therewith. It may be noted that although the magnet exerts a strong attraction for junk not in contact with it when brought into proximity therewith, by far the greatest attractive force occurs upon contact with the magnet or other junk already in contact therewith and maximum force is exerted on large pieces bridging the gap.

The disposition of the fluid passages around the center pole at the lower end of the magnet and the center part of the pole plate to which all of the junk is drawn by the radial field insures that the junk or fish is cleared of mud and detritus when it is in the position where it is most readily picked up by the magnetic field. The circumferential disposition of the fluid passages around the central pole insures that the passages will not be blocked by the first junk contacted.

The pole plate not only serves to control the strength and disposition of the magnetic field but also to protect the magnet against damage during fishing operations, magnet of this type often being somewhat brittle. The three sections of the pole plate should be either cast or soldered together to insure maximum strength.

After the tool has been assembled the magnetization of the magnet may be accomplished by placing the whole tool in a strong unidirectional field. On removal of the tool from the field the flux reverses in the housing. By magnetizing the magnet in this manner while assembled in the tool, a much greater field strength is obtained than if the magnet is separately energized and then assembled in the tool. The magnetic circuit of the fishing tool comprising the bar magnet together with the highly permeable low retentivity housing lends itself to magnetization by the method just described.

Figure 2:
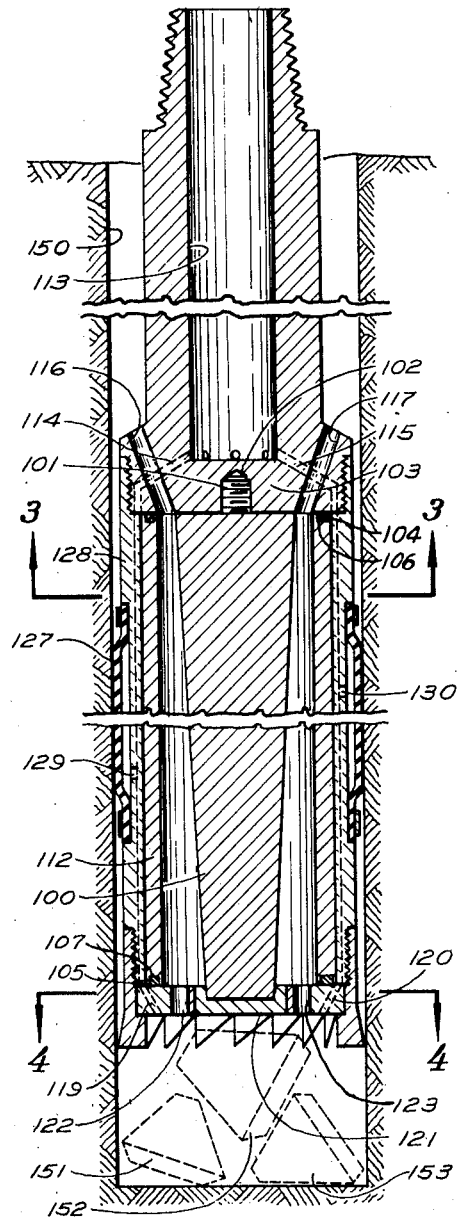
Figure 2 is a vertical section through another form of magnetic fishing tool embodying the invention.

Referring now to Figure 2 there is shown a tool generally similar to that shown in Figure 1. Only the points of difference need be described. The magnet 110 is a frustrum of a cone providing a larger cross section at the upper end than at the lower end. This increases the non-ferromagnetic gap between the housing and magnet at the lower active ends thereof insuring maximum flux density at the lower active ends thereof. At the same time the gap is reduced at the upper ends of the housing and magnet where it makes no difference if the flux jumps over at positions removed from the upper ends and it is desirable to have as low a reluctance path as possible. Also, the larger volume of permanent magnet material at the upper end provides a maximum magnetizing force in the circuit.

The upper end of the magnet is provided with a threaded stud 101 engaging a threaded hole 102 in head 103.

Figure 3:
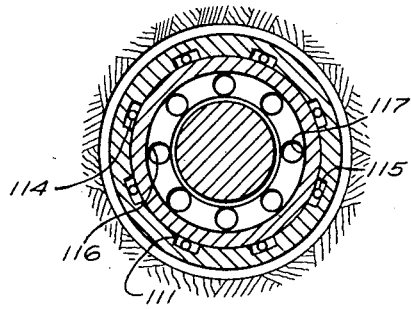
Figure 3 is a horizontal section taken on the line 3—3 of Figure 2.
Figure 4:
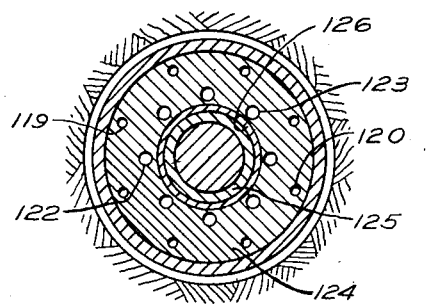
Figure 4 is a horizontal section taken on the line 4—4 of Figure 2.

The inner surface of the housing is provided with a plurality of axially extending, circumferentially spaced channels or grooves such as 111 (see also Figure 3) which form part of the non-ferromagnetic region between the magnet and housing. A ring or sleeve 112 of brass or other non-ferromagnetic material is telescoped within the housing in contact with the inner surface thereof. The ring has a larger inner diameter than the outer diameter of the magnet. The ring thus divides the non-ferromagnetic region between the magnet and housing into an inner annular passage adjacent the magnet and a plurality of outer passages formed by the ring and the channels in the housing. The outer passages are in communication with passage 113 in the fishing neck by means of the plurality of downwardly diverging circumferentially spaced fluid passages such as 114, 115. The inner passage is in communication with the exterior of the tool through a plurality of upwardly diverging fluid passages such as 116, 117.

The lower ends of the outer passage are in communication with the bottom face of the tool through a plurality of downwardly converging circumferentially spaced fluid passages such as 119, 120 through the pole plate 121. The inner passage is in communication with the lower face of the tool through a plurality of circumferentially spaced fluid passages such as 122, 123 through the pole plate which are staggered relative to passages 119, 120. The passages 119, 120 and 122, 123 are entirely within the outer ferromagnetic ring 124 of the pole plate which is separated from the central ferromagnetic area 125 by a ring 126 of brass or other non-ferromagnetic material.

A packer comprising an expansible sleeve 127 surrounds the housing 128 and is sealed thereto at its upper and lower edges. A plurality of passages such as 129, 130 extend through the housing between the interior of the packer and the channels inside the housing.

The tool of Figure 2 is thus arranged for reverse circulation. Fluid from the drill string passes down through the passages formed between the channels in the housing and the brass sleeve and then sweeps inwardly across the pole plate and back up around the central portion of the pole plate and the permanent magnet and thence out of the tool into the annulus between the drill string and the walls of the well 150. Fluid pressure is transmitted to the interior of the packer sleeve and expands it against the well wall to prevent normal circulation. The radially inward direction of the fluid across the pole plate adds to the magnetic force acting in the same direction so as to facilitate the movement of junk metal as bit cones 151, 152 and 153, toward the lower end of the magnet.

It will be apparent that some of the advantages of the invention could be obtained by making the housing of highly retentive material and the central bar of low retentive material. Also, the head and pole plate might be made of highly retentive material. Also, both the housing and central bar could be made of highly retentive material. However, the previously described arrangement is much to be preferred because it facilitates the magnetization of the tool and enables the housing, head, and pole plate to be made of tough shock and wear resisting material.

While preferred embodiments of the invention have been shown and described, it is obvious that many modifications thereof can be made by one skilled in the art without departing from the spirit of the invention and it is intended to protect by Letters Patent all forms of the invention falling within the scope of the following claims.

I claim:

1. The method of providing a highly magnetized permanent magnet fishing tool which comprises providing a central bar of highly retentive ferromagnetic material, positioning an outer housing of low retentivity ferromagnetic material concentrically of the bar, connecting one end of the housing to the adjacnt end of the bar by a ferromagnetic bridge, placing the entire assembled tool in a unidirectional magnetic field having a direction parallel to the axis of said bar to magnetize both the bar and housing in the same direction and thereafter removing the tool from said field to allow the field in the housing to reverse under the influence of the residual magnetism of the central bar.

2. The method of providing a highly magnetized permanent magnet oil well fishing tool effective for the removal of magnetic junk from oil wells including the steps of: providing a central bar of highly retentive ferromagnetic material to form the permanent magnet core of the tool, positioning a housing of low retentivity ferromagnetic material concentrically of said central bar and out of magnetic contact with said central bar, magnetically coupling one end of said bar and said housing to provide a magnetic path within the tool with a central pole at the lower end of said bar and a concentric pole surrounding and adjacent the lower end of said bar, thereafter placing the entire assembled tool in a unidirectional magnetic field having a direction parallel to the axis of said bar to simultaneously magnetize the bar and housing in the same direction, terminating application of said unidirectional magnetic field to said tool, and retaining said assembled tool apart from said unidirectional field to allow the magnetism of said highly retentive ferromagnetic material to reverse the direction of magnetization of the low retentivity ferromagnetic material to form opposite polarity concentric poles at the uncoupled ends of said bar and housing with magnetic flux flowing radially in the annular magnetic flux path therebetween completing the magnetic flux path within the tool.

3. The method of making a magnetic fishing tool which comprises providing a magnet structure having a centrally disposed bar of highly retentive ferromagnetic material and an outer concentric housing of low retentivity ferromagnetic material concentrically of the bar, and a ferromagnetic bridge connecting one end of the housing to the adjacent end of the bar, which comprises affixing to the end of the magnet structure opposite the bridge a pole plate having a central disc of ferromagnetic material in contact with the end of the bar and peripherally surrounded by an annular ring of non-magnetic material, and placing the entire assembled tool in a unidirectional magnetic field having a direction parallel to the axis of said bar to magnetize both the bar and the housing in the same direction and thereafter removing the tool from said field to allow the field in the housing to reverse under the influence of the residual magnetism of the central bar.

4. A magnetic fishing tool having in combination a central bar of high retentivity ferromagnetic material forming the permanent magnet core of the tool, a housing of low retentivity ferromagnetic material concentrically disposed about said bar and out of contact therewith, a ferromagnetic bridge joining one end of said bar with the adjacent end of said housing, and the ends of the bar and housing opposite the bridge being concentrical poles of opposite polarity having therebetween an annular magnetic flux path as a portion of the magnetic circuit of the tool, said tool having been magnetized by placing the assembled tool in a unidirectional field having a direction parallel to the axis of said bar to magnetize the bar and housing in the same direction and thereafter removing the tool from said field to allow the field in the housing to reverse under the influence of the residual magnetism of the central bar.

References Cited in the file of this patent

UNITED STATES PATENTS

| 2,075,488 | Wagar | Mar. 30, 1937 |
| 2,175,994 | Quam | Oct. 10, 1939 |
| 2,668,077 | Kirby | Feb. 2, 1954 |

FOREIGN PATENTS

| 588,312 | Great Britain | May 20, 1947 |

OTHER REFERENCES

Permanent Magnets—Circular of the National Bureau of Standards C448, issued August 10, 1944, pages 16 and 17.